US008024123B2

(12) United States Patent
Priezzhev et al.

(10) Patent No.: US 8,024,123 B2
(45) Date of Patent: Sep. 20, 2011

(54) SUBTERRANEAN FORMATION PROPERTIES PREDICTION

(75) Inventors: Ivan Priezzhev, Moscow (RU); Gaston Bejarano, Tanager (NO); Leo Shmaryan, Moscow (RU)

(73) Assignee: Schlumberger Technology Corporation, Sugar Land, TX (US)

( * ) Notice: Subject to any disclaimer, the term of this patent is extended or adjusted under 35 U.S.C. 154(b) by 423 days.

(21) Appl. No.: 12/264,433

(22) Filed: Nov. 4, 2008

(65) Prior Publication Data
US 2009/0119018 A1    May 7, 2009

Related U.S. Application Data

(60) Provisional application No. 60/986,249, filed on Nov. 7, 2007.

(51) Int. Cl.
G06F 19/00 (2011.01)
G01V 1/00 (2006.01)
G06N 3/00 (2006.01)

(52) U.S. Cl. ............. 702/11; 175/58; 367/21; 706/21
(58) Field of Classification Search ............ 702/11, 702/14; 175/58, 61; 367/21; 706/21, 25
See application file for complete search history.

(56) References Cited

U.S. PATENT DOCUMENTS

| 5,444,619 | A | 8/1995 | Hoskins et al. |
| 5,992,519 | A | 11/1999 | Ramakrishnan et al. |
| 6,236,942 | B1 | 5/2001 | Bush |
| 6,313,837 | B1 | 11/2001 | Assa et al. |
| 6,735,526 | B1 | 5/2004 | Meldahl et al. |
| 7,184,367 | B2 | 2/2007 | Yin |
| 7,248,259 | B2 | 7/2007 | Fremming et al. |
| 2003/0216897 | A1 | 11/2003 | Endres et al. |
| 2005/0149307 | A1 | 7/2005 | Gurpinar et al. |
| 2005/0288863 | A1* | 12/2005 | Workman ................. 702/14 |
| 2006/0197759 | A1 | 9/2006 | Fremming |

FOREIGN PATENT DOCUMENTS

| WO | 99/64896 | 12/1999 |
| WO | 2004/049216 | 6/2004 |

OTHER PUBLICATIONS

Banchs, R.E. and Michelena, R.J.: "From 3D Seismic Attributes to Pseudo-Well-Log Volumes Using Neural Networks: Practical Considerations," The Leading Edge, Oct. 2002, 4 pages.
Veeken, P.H.C. and Da Silva, M.: "Seismic Inversion Methods and Some of Their Constraints," First Break vol. 22, Jun. 2004, 24 pages.
Hampson, D.P., Schuelke, J.S., and Quirein, J.A.: "Use of Multiattribute Transforms to Predict Log Properties from Seismic Data," Geophysics vol. 66, No. 1, Jan.-Feb. 2001, 17 pages.

* cited by examiner

*Primary Examiner* — Bryan Bui

(57) ABSTRACT

A method for predicting subterranean formation properties of a wellsite. The method includes obtaining seismic data for an area of interest, obtaining an initial seismic cube using the seismic data, and obtaining a shifted seismic cubes using the seismic data, where each of the shifted seismic cubes is shifted from the initial seismic cube obtaining a shifted seismic cubes using the seismic data, where each of the shifted seismic cubes is shifted from the initial seismic cube. The method further includes generating a neural network using the initial seismic cube, the shifted seismic cubes, and well log data and applying the neural network to the seismic data to obtain a model for the area of interest, where the model is used to adjust an operation of the wellsite.

20 Claims, 8 Drawing Sheets

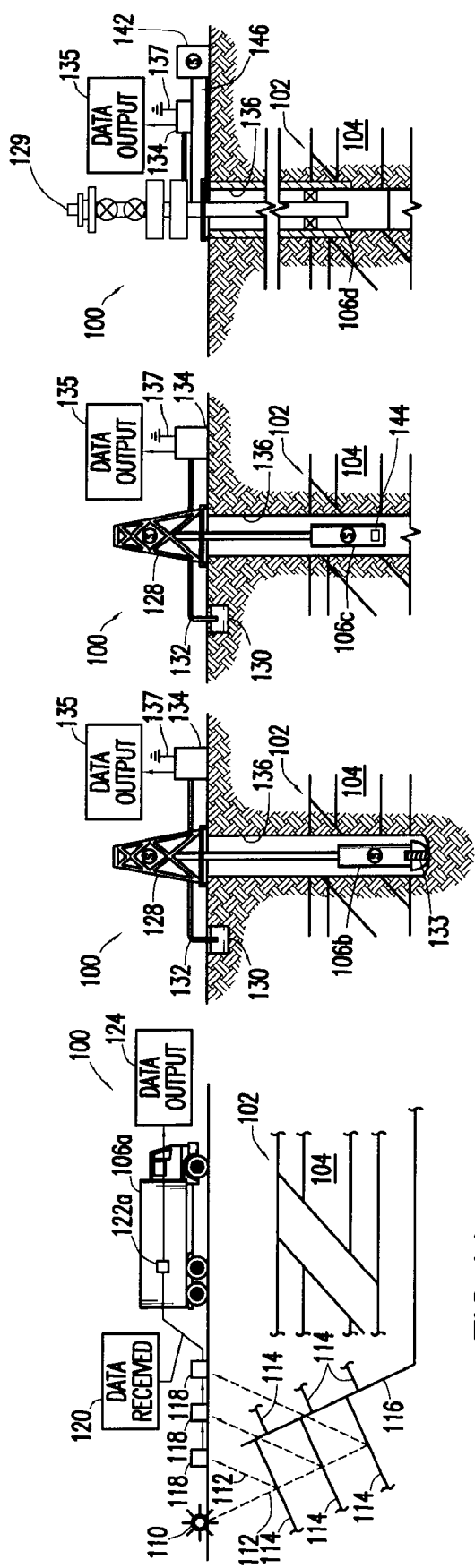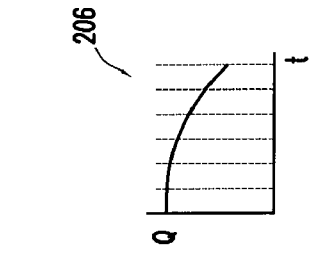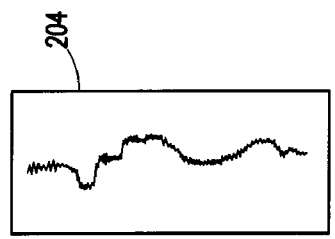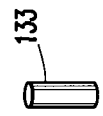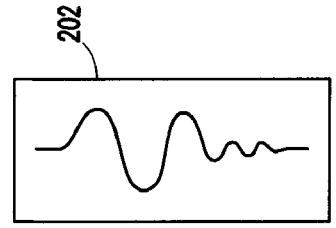

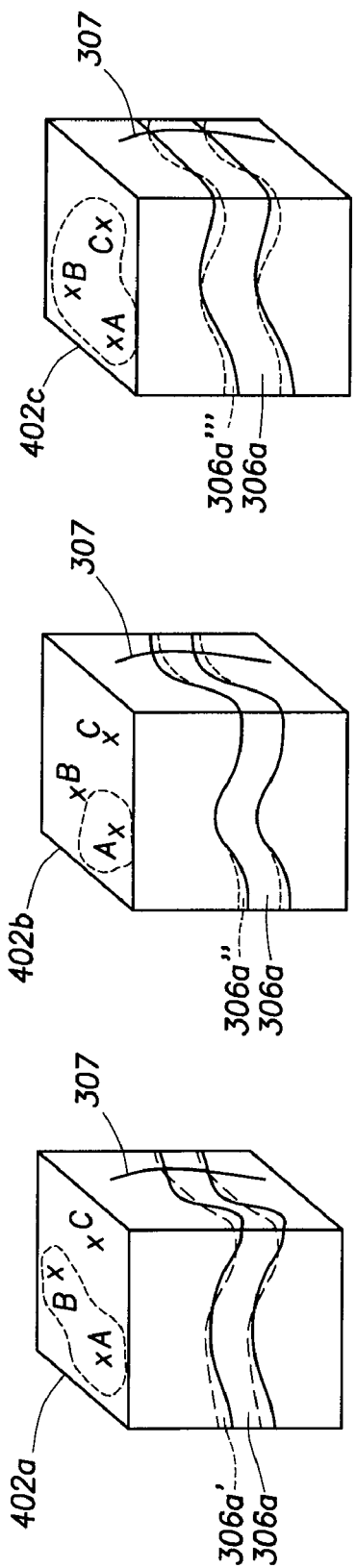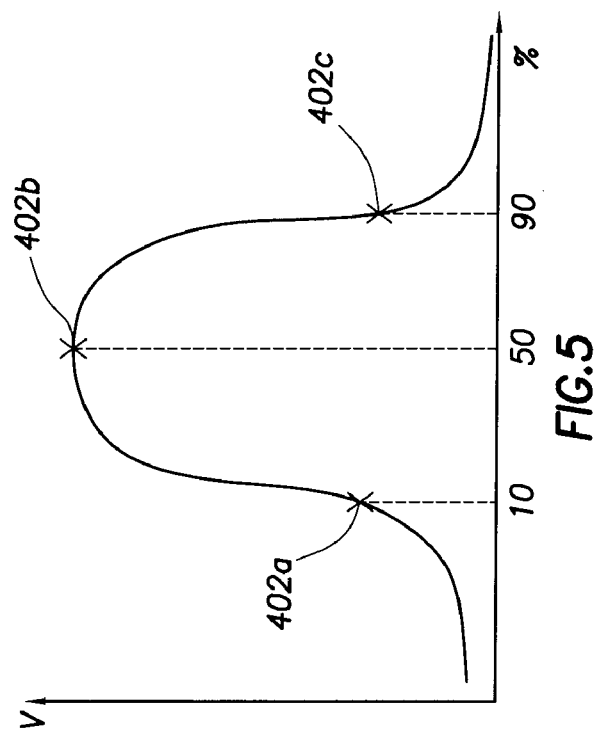
FIG.4C
FIG.4B
FIG.4A
FIG.5

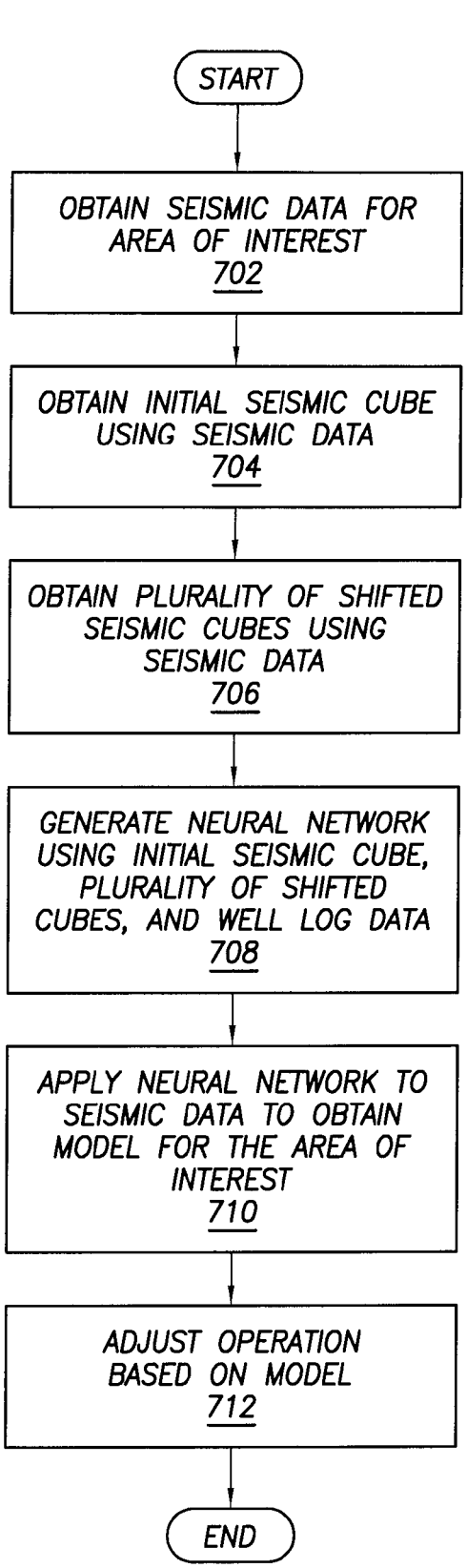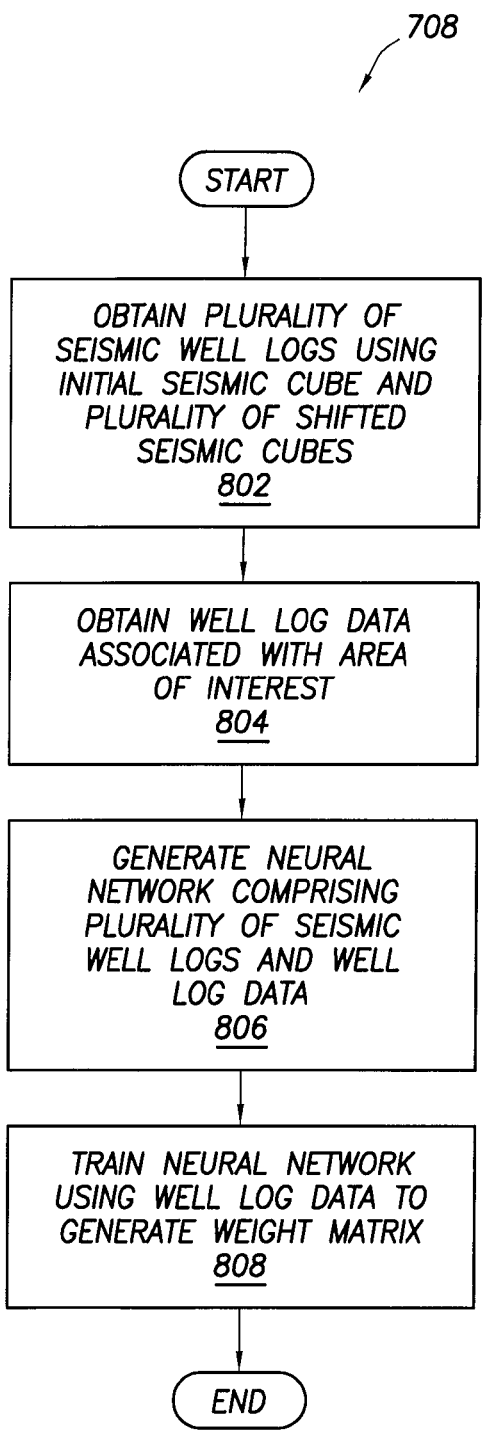
FIG.7
FIG.8

SUBTERRANEAN FORMATION PROPERTIES PREDICTION

CROSS-REFERENCE TO RELATED APPLICATION

This application claims priority, pursuant to 35 U.S.C. §119(e), to the filing date of U.S. Patent Application Ser. No. 60/986,249, entitled "System and Method for Predicting Subterranean Formation Properties," filed on Nov. 7, 2007, which is hereby incorporated by reference in its entirety.

BACKGROUND

Operations, such as surveying, drilling, wireline testing, completions, production, planning and oilfield analysis, are typically performed to locate and gather valuable downhole fluids. Surveys are often performed using acquisition methodologies, such as seismic scanners or surveyors to generate maps of underground formations. These formations are often analyzed to determine the presence of subterranean assets, such as valuable fluids or minerals, or to determine if the formations have characteristics suitable for storing fluids.

During drilling and production operations, data is typically collected for analysis and/or monitoring of the operations. Such data may include, for example, information regarding subterranean formations, equipment, and historical and/or other data.

Data concerning the subterranean formation is collected using a variety of sources. Such formation data may be static or dynamic. Static data relates to, for example, formation structure and geological stratigraphy that define geological structures of the subterranean formation. Dynamic data relates to, for example, fluids flowing through the geologic structures of the subterranean formation over time. Such static and/or dynamic data may be collected to learn more about the formations and the valuable assets contained therein.

SUMMARY

In one example implementation of subterranean formation properties prediction, a system for predicting subterranean formation properties of a wellsite includes a processing module configured to obtain seismic data for an area of interest. The system further includes a modeling unit configured to obtain an initial seismic cube using the seismic data and obtain a number of shifted seismic cubes using the seismic data, where each of the number of shifted seismic cubes is shifted from the initial seismic cube. The system further includes a training module configured to generate a neural network using the initial seismic cube, the number of shifted seismic cubes, and well log data. The training module is further configured to apply the neural network to the seismic data to obtain a model for the area of interest, where the model can be used to adjust an operation of the wellsite.

Other aspects of subterranean formation properties prediction will be apparent from the following description and the appended claims.

BRIEF DESCRIPTION OF DRAWINGS

So that the above described features and advantages of subterranean formation properties prediction can be understood in detail, a more particular description of subterranean formation properties prediction, briefly summarized above, may be had by reference to the embodiments thereof that are illustrated in the appended drawings. It is to be noted, however, that the appended drawings illustrate only typical embodiments of subterranean formation properties prediction and are therefore not to be considered limiting of its scope, for subterranean formation properties prediction may admit to other equally effective embodiments.

FIGS. 1A-1D depict a simplified, schematic view of an oilfield having subterranean formations containing reservoirs therein, the various operations being performed on the oilfield. FIG. 1A depicts a survey operation being performed by a seismic truck. FIG. 1B depicts a drilling operation being performed by a drilling tool suspended by a rig and advanced into the subterranean formations. FIG. 1C depicts a wireline operation being performed by a wireline tool suspended by the rig and into the wellbore of FIG. 1B. FIG. 1D depicts a production operation being performed by a production tool being deployed from a production unit and into the completed wellbore of FIG. 1C for drawing fluid from the reservoirs into surface facilities.

FIGS. 2A-D are graphical depictions of data collected by the tools of FIGS. 1A-D, respectively. FIG. 2A depicts a seismic trace of the subterranean formation of FIG. 1A. FIG. 2B depicts a core test result of the core sample of FIG. 1B. FIG. 2C depicts a well log of the subterranean formation of FIG. 1C. FIG. 2D depicts a production decline curve of fluid flowing through the subterranean formation of FIG. 1D.

FIGS. 4A-4C are schematic, 3D views of static models based on the data acquired by the data acquisition tools of FIG. 3.

FIG. 5 is graphical representation of a probability plot of the static models of FIG. 4.

FIGS. 7-8 show exemplary flow charts depicting methods for predicting subterranean formation properties for an operation of a wellsite.

DETAILED DESCRIPTION

Figure 3:
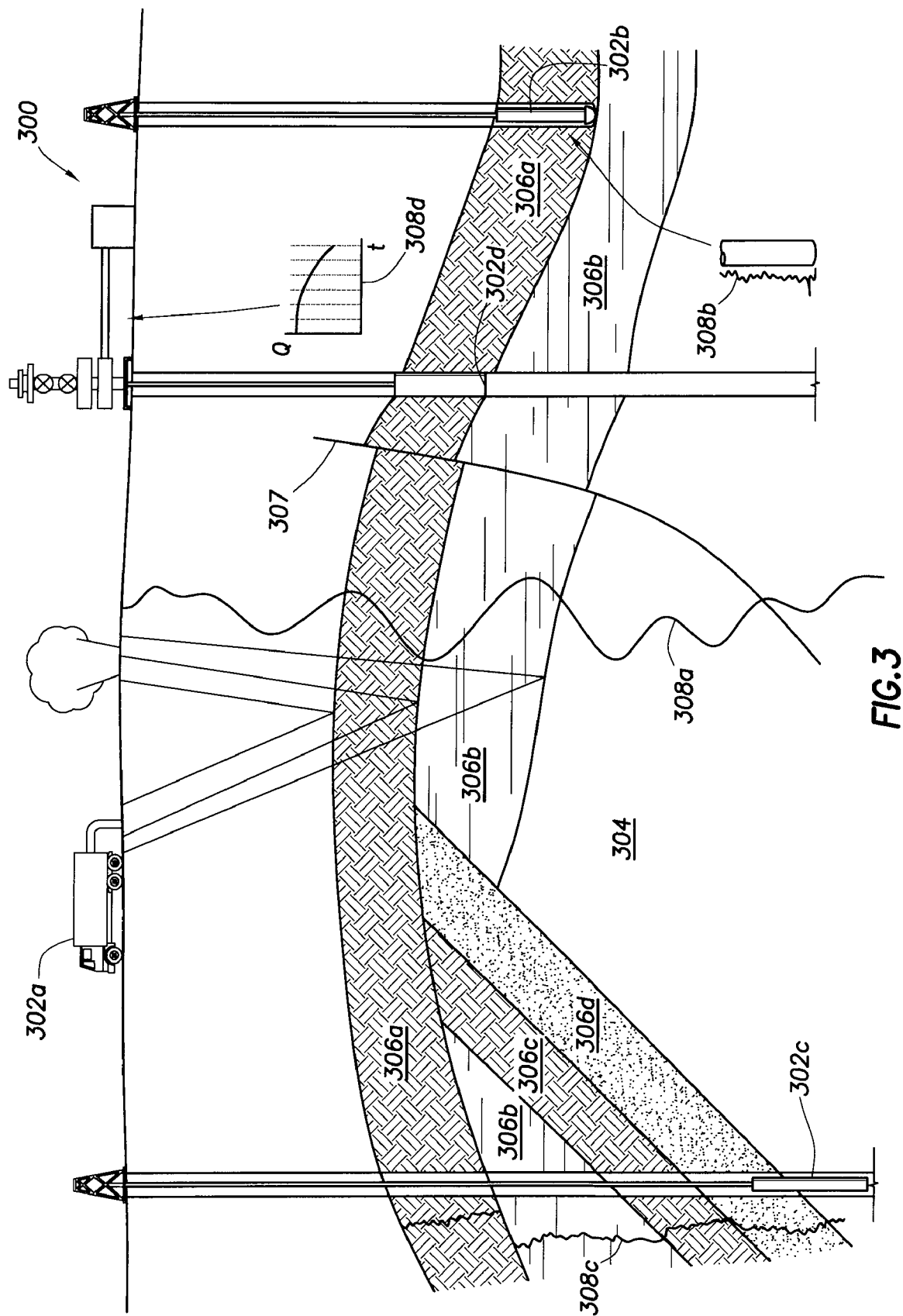
FIG. 3 is a schematic view, partially in cross section of an oilfield having a plurality of data acquisition tools positioned at various locations along the oilfield for collecting data from the subterranean formations.

Specific embodiments of subterranean formation properties prediction will now be described in detail with reference to the accompanying figures. Like elements in the various figures are denoted by like reference numerals for consistency.

In the following detailed description of embodiments of subterranean formation properties prediction, numerous specific details are set forth in order to provide a more thorough understanding of subterranean formation properties prediction. In other instances, well-known features have not been described in detail to avoid obscuring the concepts of subterranean formation properties prediction.

In describing subterranean formation properties prediction, like or identical reference numerals are used to identify common or similar elements. The figures are not necessarily to scale and certain features and certain views of the figures may be shown exaggerated in scale or in schematic in the interest of clarity and conciseness.

FIGS. 1A-1D depict simplified, representative, schematic views of an oilfield (100) having a subterranean formation (102) containing a reservoir (104) therein and depicting various operations being performed on the oilfield including at least one wellsite. FIG. 1A depicts a survey operation being performed by a survey tool, such as seismic truck (106a), to measure properties of the subterranean formation. The survey operation is a seismic survey operation for producing sound vibrations. In FIG. 1A, one such sound vibration (112) generated by a source (110) reflects off a plurality of horizons (114) in an earth formation (116). The sound vibration(s) (112) is (are) received in by sensors, such as geophone-receivers (118) situated on the earth's surface. The geophones (118) produce electrical output signals, referred to as data received (120) in FIG. 1A.

In response to the received sound vibration(s) (112) representative of different parameters (such as amplitude and/or frequency) of the sound vibration(s) (112), the geophones (118) produce electrical output signals containing data concerning the subterranean formation. The data received (120) is provided as input data to a computer (122a) of the seismic truck (106a). Responsive to the input data, the computer (122a) generates a seismic data output (124). The seismic data output may be stored, transmitted or further processed as desired, for example by data reduction. For instance, digital signal filtering tools may be applied to the seismic data output (e.g., seismic traces) to reduce noise and to define and apply correction parameters to sum single seismic signal traces that share a common geographical location in order to enhance the signal-to-noise ratio. Further, special algorithms may be used to image the seismic reflections in three-dimensional space. In this example, the result of the processing may produce a seismic cube that represents the earth's underground layers as accurately as possible and that can be used by geologists to interpret major geologic structures. In addition, the seismic cube can be used in combination with well log data to analyze geologic structures.

FIG. 1B depicts a drilling operation being performed by a drilling tool (106b) suspended by a rig (128) and advanced into the subterranean formations (102) to form a wellbore (136). A mud pit (130) is used to draw drilling mud into the drilling tools via flow line (132) for circulating drilling mud through the drilling tools, up the wellbore (136) and back to the surface. The drilling mud is usually filtered and returned to the mud pit. A circulating system may be used for storing, controlling or filtering the flowing drilling mud. The drilling tools are advanced into the subterranean formations to reach reservoir (104). Each well may target one or more reservoirs. The drilling tools are adapted for measuring downhole properties using one or more logging while drilling tools. Logging while drilling tools may also be adapted for taking a core sample (133) as shown, or removed so that a core sample may be taken using another tool.

A surface unit (134) is used to communicate with the drilling tools and/or offsite operations. The surface unit is capable of communicating with the drilling tools to send commands to the drilling tools, and to receive data therefrom. The surface unit can be provided with computer facilities for receiving, storing, processing, and/or analyzing data from the oilfield. The surface unit collects data generated during the drilling operation and produces data output (135) which may be stored or transmitted. Computer facilities, such as those of the surface unit, may be positioned at various locations about the oilfield and/or at remote locations.

Sensors (S), such as gauges, may be positioned about the oilfield to collect data relating to various operations as described previously. As shown, the sensor S is positioned in one or more locations in the drilling tools and/or at the rig to measure drilling parameters, such as weight on bit, torque on bit, pressures, temperatures, flow rates, compositions, rotary speed and/or other parameters of the operation. Sensors may also be positioned in one or more locations in the circulating system.

The data gathered by the sensors may be collected by the surface unit and/or other data collection sources for analysis or other processing. The data collected by the sensors may be used alone or in combination with other data. The data may be collected in one or more databases and/or transmitted on or offsite. All or select portions of the data may be selectively used for analyzing and/or predicting operations of the current and/or other wellbores. The data may be historical data, real time data or combinations thereof. The real time data may be used in real time, or stored for later use. The data may also be combined with historical data or other inputs for further analysis. The data may be stored in separate databases, or combined into a single database.

The collected data may be used to perform analysis, such as modeling operations. For example, the seismic data output may be used to perform geological, geophysical, and/or reservoir engineering. The reservoir, wellbore, surface and/or process data may be used to perform reservoir, wellbore, geological, geophysical or other simulations. The data outputs from the operation may be generated directly from the sensors, or after some preprocessing or modeling. These data outputs may act as inputs for further analysis.

The data may be collected and stored at the surface unit (134). One or more surface units may be located at the oilfield, or connected remotely thereto. The surface unit may be a single unit, or a complex network of units used to perform the necessary data management functions throughout the oilfield. The surface unit may be a manual or automatic system. The surface unit may be operated and/or adjusted by a user.

The surface unit may be provided with a transceiver (137) to allow communications between the surface unit and various portions of the oilfield or other locations. The surface unit may also be provided with or functionally connected to one or more controllers for actuating mechanisms at the oilfield. The surface unit may then send command signals to the oilfield in response to data received. The surface unit may receive commands via the transceiver or may itself execute commands to the controller. A processor may be provided to analyze the data (locally or remotely), make the decisions and/or actuate the controller. In this manner, the oilfield may be selectively adjusted based on the data collected. This technique may be used to optimize portions of the operation, such as controlling drilling, weight on bit, pump rates or other parameters. These adjustments may be made automatically based on computer protocol, and/or manually by an operator. In some cases, well plans may be adjusted to select optimum operating conditions, or to avoid problems.

FIG. 1C depicts a wireline operation being performed by a wireline tool (106c) suspended by the rig (128) and into the wellbore (136) of FIG. 1B. The wireline tool is adapted for deployment into a wellbore for generating well logs, performing downhole tests and/or collecting samples. The wireline tool may be used to provide another method and apparatus for performing a seismic survey operation. The wireline tool of FIG. 1C may, for example, have an explosive, radioactive, electrical, or acoustic energy source (144) that sends and/or receives electrical signals to the surrounding subterranean formations (102) and fluids therein.

The wireline tool may be operatively connected to, for example, the geophones (118) and the computer (122a) of the seismic truck (106a) of FIG. 1A. The wireline tool may also provide data to the surface unit (134). The surface unit collects data generated during the wireline operation and produces data output (135) which may be stored or transmitted. The wireline tool may be positioned at various depths in the wellbore to provide a survey or other information relating to the subterranean formation.

Sensors (S), such as gauges, may be positioned about the oilfield to collect data relating to various operations as described previously. As shown, the sensor (S) is positioned in the wireline tool to measure downhole parameters which relate to, for example porosity, permeability, fluid composition and/or other parameters of the operation.

FIG. 1D depicts a production operation being performed by a production tool (106d) deployed from a production unit or Christmas tree (129) and into the completed wellbore (136) of FIG. 1C for drawing fluid from the downhole reservoirs into surface facilities (142). Fluid flows from reservoir (104) through perforations in the casing (not shown) and into the production tool (106d) in the wellbore (136) and to the surface facilities (142) via a gathering network (146).

Sensors (S), such as gauges, may be positioned about the oilfield to collect data relating to various operations as described previously. As shown, the sensor (S) may be positioned in the production tool (106d) or associated equipment, such as the Christmas tree, gathering network, surface facilities and/or the production facility, to measure fluid parameters, such as fluid composition, flow rates, pressures, temperatures, and/or other parameters of the production operation.

While only simplified wellsite configurations are shown, it will be appreciated that the oilfield may cover a portion of land, sea and/or water locations that host one or more wellsites. Production may also include injection wells (not shown) for added recovery. One or more gathering facilities may be operatively connected to one or more of the wellsites for selectively collecting downhole fluids from the wellsite(s).

While FIGS. 1B-D depict tools used to measure properties of an oilfield, it will be appreciated that the tools may be used in connection with non-operations, such as mines, aquifers, storage or other subterranean facilities. Also, while certain data acquisition tools are depicted, it will be appreciated that various measurement tools capable of sensing parameters, such as seismic two-way travel time, density, resistivity, production rate, etc., of the subterranean formation and/or its geological formations may be used. Various sensors (S) may be located at various positions along the wellbore and/or the monitoring tools to collect and/or monitor the desired data. Other sources of data may also be provided from offsite locations.

The oilfield configuration of FIGS. 1A-D are intended to provide a brief description of an example of an oilfield usable with subterranean formation properties prediction. Part, or all, of the oilfield may be on land, water and/or sea. Also, while a single oilfield measured at a single location is depicted, subterranean formation properties prediction may be utilized with any combination of one or more oilfields, one or more processing facilities and one or more wellsites.

FIGS. 2A-D are graphical depictions of examples of data collected by the tools of FIGS. 1A-D, respectively. FIG. 2A depicts a seismic trace (202) of the subterranean formation of FIG. 1A taken by seismic truck (106a). The seismic trace may be used to provide data, such as a two-way response over a period of time. FIG. 2B depicts a core sample (133) taken by the drilling tools (106b). The core sample may be used to provide data, such as a graph of the density, porosity, permeability or other physical property of the core sample over the length of the core. Tests for density and viscosity may be performed on the fluids in the core at varying pressures and temperatures. FIG. 2C depicts a well log (204) of the subterranean formation of FIG. 1C taken by the wireline tool (106c). The wireline log typically provides a resistivity or other measurement of the formation at various depts. FIG. 2D depicts a production decline curve or graph (206) of fluid flowing through the subterranean formation of FIG. 1D measured at the surface facilities (142). The production decline curve typically provides the production rate Q as a function of time t.

The respective graphs of FIGS. 2A-2C depict examples of static measurements that may describe or provide information about the physical characteristics of the formation and reservoirs contained therein. These measurements may be analyzed to better define the properties of the formation(s) and/or determine the accuracy of the measurements and/or for checking for errors. The plots of each of the respective measurements may be aligned and scaled for comparison and verification of the properties.

FIG. 2D depicts an example of a dynamic measurement of the fluid properties through the wellbore. As the fluid flows through the wellbore, measurements are taken of fluid properties, such as flow rates, pressures, composition, etc. As described below, the static and dynamic measurements may be analyzed and used to generate models of the subterranean formation to determine characteristics thereof. Similar measurements may also be used to measure changes in formation aspects over time.

FIG. 3 is a schematic view, partially in cross section of an oilfield (300) having data acquisition tools (302a), (302b), (302c) and (302d) positioned at various locations along the oilfield for collecting data of the subterranean formation (304). The data acquisition tools 302a-d may be the same as data acquisition tools 106a-d of FIGS. 1A-D, respectively, or others not depicted. As shown, the data acquisition tools 302a-d generate data plots or measurements 308a-d, respectively. These data plots are depicted along the oilfield to demonstrate the data generated by the various operations.

Data plots 308a-c are examples of static data plots that may be generated by the data acquisition tools 302a-d, respectively. Static data plot (308a) is a seismic two-way response time and may be the same as the seismic trace (202) of FIG. 2A. Static plot (308b) is core sample data measured from a core sample of the formation (304) similar to core sample (133) of FIG. 2B. Static data plot (308c) is a logging trace, similar to the well log (204) of FIG. 2C. Production decline curve or graph (308d) is a dynamic data plot of the fluid flow rate over time, similar to the graph (206) of FIG. 2D. Other data may also be collected, such as historical data, user inputs, economic information and/or other measurement data and other parameters of interest.

The subterranean structure (304) has a plurality of geological formations 306a-d. As shown, the structure has several formations or layers, including a shale layer (306a), a carbonate layer (306b), a shale layer (306c) and a sand layer (306d). A fault (307) extends through the layers (306a), (306b). In one implementation, the static data acquisition tools are adapted to take measurements and detect characteristics of the formations.

While a specific subterranean formation with specific geological structures is depicted, it will be appreciated that the oilfield may contain a variety of geological structures and/or formations, sometimes having extreme complexity. In some locations, typically below the water line, fluid may occupy pore spaces of the formations. Each of the measurement devices may be used to measure properties of the formations and/or its geological features. While each acquisition tool is shown as being in specific locations in the oilfield, it will be appreciated that one or more types of measurement may be taken at one or more location across one or more oilfields or other locations for comparison and/or analysis.

The data collected from various sources, such as the data acquisition tools of FIG. 3, may then be processed and/or evaluated. Typically, seismic data displayed in the static data plot (308a) from the data acquisition tool (302a) is used by a geophysicist to determine characteristics of the subterranean formations and features. Core data shown in static plot (308b) and/or log data from the well log (308c) are typically used by a geologist to determine various characteristics of the subterranean formation. Production data from the graph (308d) is typically used by the reservoir engineer to determine fluid flow reservoir characteristics. The data analyzed by the geologist, geophysicist and the reservoir engineer may be analyzed using modeling techniques. Examples of modeling techniques are described in U.S. Pat. No. 5,992,519, WO2004/049216, WO1999/064896, U.S. Pat. No. 6,313,837, US2003/0216897, U.S. Pat. No. 7,248,259, US2005/0149307 and US2006/0197759. Systems for performing such modeling techniques are described, for example, in issued U.S. Pat. No. 7,248,259, the entire contents of which is hereby incorporated by reference.

FIGS. 4A-4C depict three-dimensional graphical representations of the subsurface referred to as a static model. The static model may be generated based on one or more of the models generated from, for example, the data gathered using the data acquisition tools 302a-d. In the FIGS. provided, the static models 402a-c are generated by the data acquisition tools 302a-c of FIG. 3, respectively. These static models may provide a bi-dimensional view of the subterranean formation, based on the data collected at the given location.

The static models may have different accuracies based on the types of measurements available, quality of data, location and other factors. While the static models of FIGS. 4A-C are taken using certain data acquisition tools at a single location of the oilfield, one or more of the same or different data acquisition tools may be used to take measurements at one or more locations throughout the oilfield to generate a variety of models. Various analysis and modeling techniques may be selected depending on the desired data type and/or location.

Each of the static models 402a-c is depicted as volumetric representations of an oilfield with one or more reservoirs, and their surrounding formation structures. These volumetric representations are a prediction of the geological structure of the subterranean formation at the specified location based upon available measurements. In one possible implementation, the representations are probable scenarios, created using the same input data (historical and/or real time), but having differing interpretation, interpolation, and modeling techniques. As shown, the static models contain geological layers within the subterranean formation. In particular fault (307) of FIG. 3 extends through each of the models. Each static model also has reference points A, B and C located at specific positions along each of the static models. These static models and the specific reference points of the static models may be analyzed. For example, a comparison of the different static models may show differences in the structure of fault (307) and the adjacent layer (306a). Each of the reference points may assist in the comparison between the various static models. Adjustments may be made to the models based on an analysis of the various static models in FIGS. 4A-C, and an adjusted formation layer may be generated as will be described further below.

FIG. 5 is graphical representation of a probability plot of multiple static models, such as the models 402A-C of FIG. 4. The graph depicts the percent probability of a particular model variable for each of the static models as a function of a reservoir variable (V), such as volumetrics, production rate or other parameter. The variable could be any static or dynamic component(s) being assessed, such as volumetrics, gross rock thickness, net pay, production rate, cumulative production, etc. In one possible implementation, the variables in the modeling exercise are held within reasonable predictions of what the real reservoir(s) are capable of, or what has been observed in similar reservoirs. This graph is a histogram showing multiple model realizations that may be generated by the provided data. The variable results may be generated by varying multiple model parameters. The graph may then be generated by reviewing and estimating the probability of the models generated and plotting them.

As shown, the histogram indicates that static model (402a) provides a ten percent probability of matching what the actual reservoir parameter will be. The histogram as shown also indicates that static model (402b) has a fifty percent probability of matching, and static model (402c) a ninety percent probability. This graph suggests that static model (402c) is the more conservative model estimate of variable (V), but has the stronger likelihood of being correct, and static model (402a) provides the least confidence, and would be considered the more optimistic estimate. The static models and their associated likelihoods may be used, for example in determining field development plans and surface facility production model. A static model representation (402a) through (402c) may be selected based upon a desired risk and/or economic tolerance.

Referring back to the static models of FIG. 4A-C, the models have been adjusted based on the dynamic data provided in the production of the graph (308d) of FIG. 3. The dynamic data collected by data acquisition tool (302d) is applied to each of the static models 4A-4C. As shown, the dynamic data indicates that the fault (307) and layer (306a) as predicted by the static models may need adjustment. The layer (306a) has been adjusted in each model as shown by the dotted lines. The modified layer is depicted as 306a', 306a" and 306a''' for the static models of FIGS. 4A-C, respectively.

The dynamic data may indicate that certain static models provide a better representation of the oilfield. A static model's ability to match historical production rate data may be considered a good indication that it may also give accurate predictions of future production. In such cases, a preferred static model may be selected. In this case, while the static model of FIG. 4C may have the highest overall probability of accuracy based solely on the static model as shown in FIG. 5, an analysis of the dynamic model suggests that the model of FIG. 4B is a better match. As shown in FIGS. 4A-C, a comparison of layers (306a) with layers 306a', 306a" and 306a''' indicates that fault (307) with associated fluid transmissibility across the fault most closely matches the prediction provided by static model (402b).

In this example, the selected static model (402b) is modified based on the dynamic data. The resulting adjusted model (402b) has been adjusted to better match the production data. As shown, the position of the geological structure (306a) has been shifted to 306a" to account for the differences shown by the dynamic data. As a result, the static model may be adapted to better fit both static and dynamic models.

In determining the best overall earth model, the static and/or dynamic data may be considered. In this case, when considering both the static and dynamic data, the static model (402b) of FIG. 4B is selected as the earth model with the highest probability of accuracy based on both the static probabilities and dynamic input. To obtain the best overall model, it may be desirable to consider the static and dynamic data from multiple sources, locations and/or types of data.

The evaluation of the various static and dynamic data of FIG. 3 involves considerations of static data, such as seismic data considered by a geophysicist (308a), geological data considered by a geologist (308b, 308c) and production data considered by a reservoir engineer (308d). Each individual typically considers data relating to a specific function and provides models based on this specific function. However, as depicted in FIGS. 4A-C, information from each of the separate models may affect the decision on the best overall earth model. Moreover, information from other models or sources may also affect adjustments to the model and/or selection of the best overall earth model. The earth model generated as described in FIGS. 4A-5 is a basic earth model determined from an analysis of the various models provided.

Another source of information that may affect the model(s) is economic information. Throughout the operations depicted in FIGS. 1A-D, there are numerous business considerations. For example, the equipment used in each of these FIGS. has various costs and/or risks associated therewith. At least some of the data collected at the oilfield relates to business considerations, such as value and risk. This business data may include, for example, production costs, rig time, storage fees, price of oil/gas, weather considerations, political stability, tax rates, equipment availability, geological environment, accuracy and sensitivity of the measurement tools, data representations and other factors that affect the cost of performing the operations or potential liabilities relating thereto. Decisions may be made and strategic business plans developed to alleviate potential costs and risks. For example, an oilfield plan may be based on these business considerations. Such an oilfield plan may, for example, determine the location of the rig, as well as the depth, number of wells, duration of operation, rate of production, type of equipment, and other factors that will affect the costs and risks associated with the operation.

Figure 6:
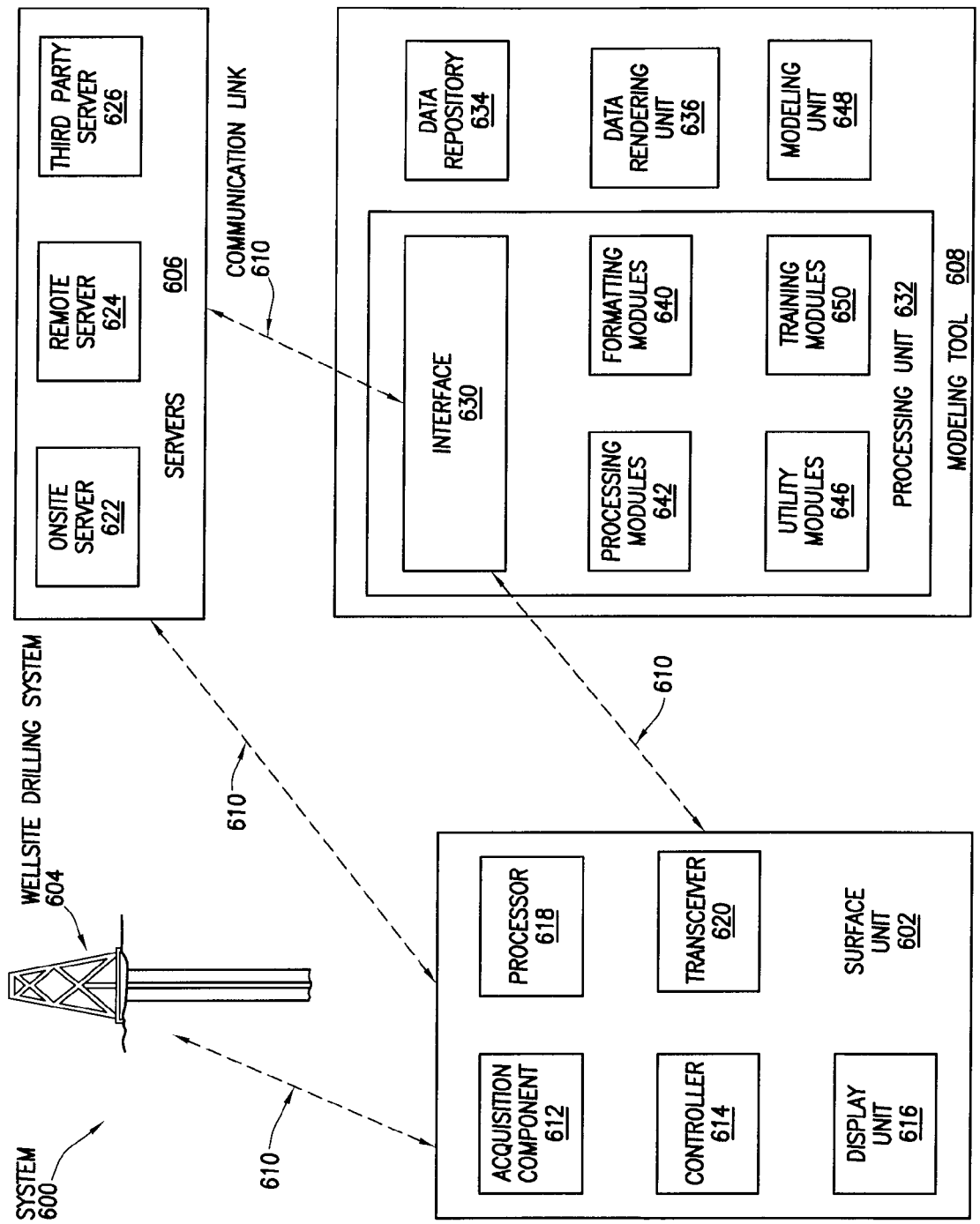
FIG. 6 shows an exemplary schematic diagram of a system for predicting subterranean formation properties for an operation of a wellsite.

FIG. 6 is a schematic view of a system (600) for predicting subterranean formation properties for an operation of a wellsite. As shown, the system (600) includes a surface unit (602) operatively connected to a wellsite drilling system (604), servers (606) operatively linked to the surface unit (602), and a modeling tool (608) operatively linked to the servers (606). As shown, communication links (610) are provided between the wellsite drilling system (604), surface unit (602), servers (606), and modeling tool (608). A variety of links may be provided to facilitate the flow of data through the system. For example, the communication links (610) may provide for continuous, intermittent, one-way, two-way and/or selective communication throughout the system (600). The communication links (610) may be of any type, such as wired, wireless, etc.

The wellsite drilling system (604) and surface unit (602) may be the same drilling system and surface unit of FIGS. 1B-1C. The surface unit (602) may be provided with an acquisition component (612), a controller (614), a display unit (616), a processor (618) and a transceiver (620). The acquisition component (612) collects and/or stores data of the oilfield including a wellsite. This data may be data measured by the sensors (S) of the wellsite as described with respect to FIGS. 1A-1D. This data may also be data received from other sources. The data may also be stored on a computer readable medium such as a compact disk, DVD, optical media, volatile storage, non-volatile storage, or any other medium configured to store the data.

The controller (614) is enabled to enact commands at the oilfield. The controller (614) may be provided with an actuation mechanism that can perform operations, such as steering, advancing, or otherwise taking action at the wellsite. Commands may be generated based on logic of the processor (618), or by commands received from other sources. The processor (618) can be provided with features for manipulating and analyzing the data. The processor (618) may be provided with additional functionality to perform operations.

A display unit (616) may be provided at the wellsite and/or remote locations for viewing oilfield data (not shown). The oilfield data represented by a display unit (616) may be raw data, processed data and/or data outputs generated from various data. In one implementation, the display unit (616) is adapted to provide flexible views of the data, so that the screens depicted may be customized as desired. A user may determine the desired course of action during drilling based on reviewing the displayed oilfield data. The operation may be selectively adjusted in response to the display unit (616). The display unit (616) may include a two dimensional display for viewing oilfield data or defining oilfield events. For example, the two dimensional display may correspond to an output from a printer, plot, a monitor, or another device configured to render two dimensional output. The display unit (616) may also include a three-dimensional display for viewing various aspects of the operation. At least some aspect of the operation is viewed in real time in the three-dimensional display. For example, the three dimensional display may correspond to an output from a printer, plot, a monitor, or another device configured to render three dimensional output.

The transceiver (620) is configured to for provide data access to and/or from other sources. The transceiver (620) is also configured to enable communication with other components, such as the servers (606), the wellsite drilling system (604), surface unit (602) and/or the modeling tool (608).

The servers (606) may be used to transfer data from one or more wellsites to the modeling tool (608). As shown, the server (606) includes onsite servers (622), a remote server (624) and a third-party server (626). The onsite servers (622) may be positioned at the wellsite and/or other adjacent locations for distributing data from the surface unit (602). The remote server (624) is positioned at a location away from the oilfield and provides data from remote sources. The third-party server (626) may be onsite or remote, but is operated by a third-party, such as a client.

In one implementation, the servers (606) are capable of transferring drilling data (e.g., logs), drilling events, trajectory, and/or other oilfield data (e.g., seismic data, historical data, economics data, or other data that may be of use during analysis). The type of server is not intended to limit subterranean formation properties prediction. For example, the system can be adapted to function with any type of server that may be employed.

The servers (606) communicate with the modeling tool (608) as indicated by the communication links (610). As indicated by the multiple arrows, the servers (606) may have separate communication links (610) with the modeling tool (608). One or more of the servers (606) may be combined or linked to provide a combined communication link (610).

The servers (606) collect a wide variety of data. The data may be collected from a variety of channels that provide a certain type of data, such as well logs. The data from the servers (606) is passed to the modeling tool (608) for processing. The servers (606) may also be used to store and/or transfer data.

The modeling tool (608) is operatively linked to the surface unit (602) for receiving data therefrom. In some cases, the modeling tool (608) and/or server(s) (606) may be positioned at the wellsite. The modeling tool (608) and/or server(s) (606) may also be positioned at various locations. The modeling tool (608) may be operatively linked to the surface unit via the server(s) (606). The modeling tool (608) may also be included in or located near the surface unit (602).

The modeling tool (608) includes an interface (630), a processing unit (632), a modeling unit (648), a data repository (634) and a data rendering unit (636). The interface (630) communicates with other components, such as the servers (606). The interface (630) may also permit communication with other oilfield or non-oilfield sources. The interface (630) receives the data and maps the data for processing. Data from servers (606) typically streams along predefined channels which may be selected by the interface (630).

As depicted in FIG. 6, the interface (630) selects the data channel of the server(s) (606) and receives the data. The interface (630) also maps the data channels to data from the wellsite. The interface (630) may also receive data from a data file (i.e., an extensible markup language (XML) file, a dBase file, or some other data file format). The data may then be passed to the processing modules (642) of the modeling tool (608). The data may be immediately incorporated into the modeling tool (608) for real-time sessions or modeling. The interface (630) creates data requests (for example surveys, logs and risks), displays the user interface, and handles connection state events. The interface (630) also instantiates the data into a data object for processing. The interface (630) may receive a request from at the surface unit (602) to retrieve data from the servers (606), the well unit, and/or data files.

The processing unit (632) includes formatting modules (640), processing modules (642), utility modules (646), and training modules (650). These modules are designed to manipulate the oilfield data for real-time analysis.

The formatting modules (640) are used to conform the data to a desired format for processing. Incoming data may need to be formatted, translated, converted or otherwise manipulated for use. The formatting modules (640) are configured to enable the data from a variety of sources to be formatted and used so that the data processes and displays in real time.

The utility modules (646) provide support functions to the drilling system. The utility modules (646) include the logging component (not shown) and the user interface (UI) manager component (not shown). The logging component provides a common call for all logging data. The logging component allows the logging destination to be set by the application. The logging component may also be provided with other features, such as a debugger, a messenger, and a warning system, among others. The debugger sends a debug message to those using the system. The messenger sends information to subsystems, users, and others. The information may or may not interrupt the operation and may be distributed to various locations and/or users throughout the system. The warning system may be used to send error messages and warnings to various locations and/or users throughout the system. In some cases, the warning messages may interrupt the process and display alerts.

The UI manager component creates user interface elements for displays. The UI manager component defines user input screens, such as menu items, context menus, toolbars, and settings windows. The user manager component may also be used to handle events relating to these user input screens.

The processing module (642) may be used to analyze the data and generate outputs. As described above, the data may include static data, dynamic data, historic data, real-time data, or other types of data. Further, the data may relate to various aspects of the operations, such as formation structure, geological stratigraphy, core sampling, well logging, density, resistivity, fluid composition, flow rate, downhole condition, surface condition, equipment condition, or other aspects of the operations.

The processing modules (642) may be used to analyze these data for generating an earth model. For example, seismic data or a well trajectory may be defined from analyzing these data. Seismic data may be obtained from a variety of seismic sources for an area of interest in the subsurface. Examples of seismic sources include, but are not limited to: a seismic truck, such as that described in FIG. 1A, seismic explosive, or a seismic survey boat. Further, a well trajectory may include well log data as collected by the well logging tools of FIGS. 1A-D. Examples of well log data include acoustic impedance, density, porosity, resistivity, etc., at various depths of the well trajectory.

The data repository (634) may store the data for the modeling unit. The data may be stored in a format available for use in real-time (e.g., information is updated at approximately the same rate the information is received). The data is generally passed to the data repository from the processing component. The data may be persisted in the file system (e.g., as an extensible markup language (XML) file) or in a database. The system (600) may determine which storage is the most appropriate to use for a given piece of data and stores the data in a manner to enable automatic flow of the data through the rest of the system in a seamless and integrated fashion. The system (600) may also facilitate manual and automated workflows (such as Modeling, Geological & Geophysical workflows) based upon the persisted data.

The data rendering unit (636) performs rendering algorithm calculation to provide one or more displays for visualizing the data. The displays may be presented to a user at the display unit (616). The data rendering unit (636) may include a two-dimensional canvas, a three-dimensional canvas, a well section canvas or other canvases as desired.

The data rendering unit (636) may selectively provide displays composed of any combination of one or more canvases. The canvases may or may not be synchronized with each other during display. The data rendering unit (636) may be provided with mechanisms for actuating various canvases or other functions in the system. Further, the data rendering unit (636) may be configured to provide displays representing the oilfield events generated from the real-time drilling data acquired in real-time during drilling, the oilfield events generated from historic data of neighboring wellbores compiled over time, the current trajectory of the wellbore during drilling, the earth model generated from static data of subterranean geological features, and/or any combinations thereof. In addition, the data rendering unit (636) may be configured to selectively adjust the displays based on real-time drilling data such as the drilling tool of the drilling system (604) advances into a subterranean formation.

The modeling unit (648) performs modeling functions for generating oilfield outputs. The modeling unit (648) may be a conventional modeling tool capable of performing modeling functions, such as generating, analyzing and manipulating earth models. The earth models typically include exploration and production data, such as that shown in FIG. 2A-2D. The modeling unit (648) may be used to perform relational comparisons of subsurface entities. The modeling unit (648) may also be used to update an earth model based on relational comparisons of the subsurface entities. Alternatively, the modeling unit (648) may be used to update an earth model based on input from a user.

The modeling unit (648) may also obtain seismic data. The seismic data may be as that described in FIG. 1A-1B for an area of interest. In this case, a seismic cube may include the seismic data for a subset of the area of interest. The modeling unit (648) may also obtain shifted seismic cubes by shifting a seismic cube within the area of interest. For example, a seismic cube may be shifted in a three-dimensional coordinate system along an x-axis, y-axis, and/or z-axis to obtain a shifted seismic cube. Alternatively, the modeling unit (648) may perform modeling functions in an alternate coordinate system (e.g., two-dimensional coordinate system, orthogonal coordinate system, etc.). The modeling unit (648) may also be used to obtain seismic well logs from seismic cubes.

A seismic well log may represent the seismic data along the well trajectory. Specifically, a seismic well log may include the seismic cubes occurring along the well trajectory. For example, in the case of a vertical well trajectory, a seismic well log may correspond to a seismic trace including all of the seismic cubes along a vertical axis. There may be at least one seismic well log for each well and for each seismic cube. In the case of shifted seismic cubes, multiple seismic well logs (as many as cubes) may exist for each well. The seismic cubes may be shifted at regular intervals along the vertical and horizontal axis according to shifting parameters. Alternatively, the seismic cubes may be shifted at irregular intervals along the vertical axis. In another example, the seismic cubes may be shifted along a variety of trajectories (e.g., horizontal axis, diagonal axis, etc.).

The training modules (650) may generate and train neural networks. More specifically, the training modules (650) may generate input layers and output layers to be used in neural networks. The input layer may correspond to input data to be processed in a neural network. The output layer may correspond to target output data to be generated when the neural network is trained. Each layer (e.g., input layers, output layers, etc.) may each include any number of neurons, where each neuron corresponds to an instance of data related to the layer.

Input and output layers may be generated from data received from the processing modules (642). For example, an input layer may be generated from seismic well logs (as defined above) derived from the original and shifted seismic cubes. Further, an output layer may be generated from well log data (e.g., acoustic impedance, density, resistivity, etc.).

The training modules (650) may also train neural networks. In this case, a neural network may be trained similar to the training described in U.S. Pat. No. 5,444,619 entitled "SYSTEM AND METHOD OF PREDICTING RESERVOIR PROPERTIES" and incorporated herein by reference in its entirety. More specifically, the training modules (650) may generate weight matrixes for the neural networks. For example, the weight matrix may describe the relative importance of neurons in an input layer. Further, the weight matrix may be generated using a variety of training methods (e.g., back propagation, genetic evolution, and or some other training method).

Optionally, the training module (650) may perform a statistical analysis of the input layer of a neural network to determine the potential bias (e.g., overfitting, underfitting) that may result in the output layer of a trained neural network. Specifically, the training module (650) may determine whether the training data for generating the input layer is properly proportioned to the weights of a weight matrix in order to minimize the potential for bias. Alternatively, if the amount of training data is fixed, the training module (650) may use other techniques (e.g., model selection, jittering, early stopping, weight decay, Bayesian learning, etc.) to minimize the potential for bias. For example, the training module (650) may use weight decay to decrease the size of larger weights (i.e., higher relative importance) in the neural network. In decreasing the size of larger weights, the generalization of the neural network may be improved by decreasing the variance of the output layer.

Once trained, a neural network may be used to generate a model. For example, the processing modules (642) may apply a trained neural network to seismic data to generate an acoustic impedance model. In this example, the acoustic impedance model may correspond to a three-dimensional representation of the acoustic impedance data for an area of interest associated with the seismic data.

While specific components are depicted and/or described for use in the units and/or modules of the modeling tool (608), it will be appreciated that a variety of components with various functions may be used to provide the formatting, processing, utility and coordination functions necessary to provide real-time processing in the modeling tool (608). The components may have combined functionalities and may be implemented as software, hardware, firmware, or combinations thereof.

Further, components (e.g., the processing modules (642) and the data rendering unit (636)) of the modeling tool (608) may be located in an onsite server (622) or in distributed locations where remote server (624) and/or third-party server (626) may be involved. The onsite server (622) may be located within the surface unit (602).

FIG. 7 shows a flow chart depicting a method for predicting subterranean formation properties for an operation of a wellsite. The method may be performed using, for example, the system of FIG. 6. The method may involve obtaining seismic data for an area of interest (block 702), obtaining an initial seismic cube using the seismic data (block 704), obtaining a plurality of shifted seismic cubes using the seismic data, where each of the plurality of shifted seismic cubes is shifted from the initial seismic cube (block 706), generating a neural network using the initial seismic cube, the plurality of shifted seismic cubes, and well log data (block 708), applying the neural network to the seismic data to obtain a model for the area of interest (block 710), and adjusting the operation based on the model (block 712).

The seismic data may be obtained (block 702) from a variety of sources. As discussed with respect to FIGS. 1A-1B and 6, seismic data associated with an area of interest may be generated by sensors (S) at the wellsite or from other sources. The seismic data may be transferred directly to the modeling tool (608 in FIG. 6), or transferred to the modeling tool via at least one of the servers (606 in FIG. 6). The seismic data is then generally received by the interface of the modeling tool. The seismic data may be obtained from a variety of seismic sources by the processing modules (642 in FIG. 6). For example, the processing modules (642 in FIG. 6) may obtain the seismic data from a seismic truck, such as that described in FIG. 1A. In another example, the processing modules (642 in FIG. 6) may obtain the seismic data from seismic explosives. The seismic data may then be presented as output. Specifically, the output may be provided by the data rendering unit (636 in FIG. 6) in the modeling tool and presented to a user at the display unit (616 in FIG. 6) in the surface unit (602).

An area of interest may correspond to a volume of the subsurface. Further, the area of interest may include any number of subterranean formations as described above for FIGS. 1A-1D.

Continuing with the discussion of FIG. 7, the initial seismic cube may then be obtained (block 704) based on the seismic data. The initial seismic cube may correspond to a subset of the area of interest. The user may interact with the display unit (616 in FIG. 6) to specify the initial seismic cube. Specifically, the user may specify a subset of the area of interest using the display unit (616 in FIG. 6) to obtain the initial seismic cube. Alternatively, the modeling unit (648 in FIG. 6) may specify an initial seismic cube based on the seismic data.

Next, the plurality of shifted seismic cubes may be obtained based on the seismic data (block 706). The modeling unit (648 in FIG. 6) may generate the plurality of shifted seismic cubes by shifting the initial seismic cube within the area of interest. Further, the user may specify shifting parameters (e.g., direction, range, iterations, etc.) describing how the initial seismic cube should be shifted. For example, the user may specify a range for shifting in a vertical direction and/or a range for shifting in a horizontal direction. In this case, the processing modules (642 in FIG. 6) may obtain the plurality of shifted seismic cubes using the user specified parameters.

A neural network may then be generating (block 708) by a variety of methods. For example, the neural network may be generated using the initial seismic cube, the plurality of shifted seismic cubes, and well log data. Further, the neural network may be trained using a variety of training algorithms (e.g., genetic evolution, back propagation, iterative inversion or some other training algorithm). A trained neural network may describe a non-linear relationship between seismic data and a geologic property (e.g., acoustic impedance, porosity, density, etc.) of the area of interest.

Next, the neural network may be applied to the seismic data to obtain a model for the area of interest (block 710). More specifically, the neural network may be applied to the seismic data to estimate a variety of geologic properties (e.g., acoustic impedance, porosity, density, etc.) associated with the area of interest. In one example, the seismic data for the area of interest may be obtained using a seismic truck, such as that shown in FIG. 1A. In this case, once trained, the neural network may describe a relationship between geologic properties and the seismic data. For example, a trained neural network may describe a function for calculating acoustic impedance based on seismic data. In this example, the function described by the trained neural network may be applied to the seismic data to obtain an acoustic impedance model for the area of interest.

A model may describe geologic properties for an entire area of interest. Further, the model may typically describe the geologic property described in well log data used to generate the model. In this case, the well log data may be used to train the neural network to generate models for the geologic property associated with the well log data. For example, well log data associated with acoustic impedance may be used to train a neural network for obtaining acoustic impedance models.

The operation may then be adjusted based on the model (block 712) by a variety of methods. For example, the user may adjust the operation using the controller (614 on FIG. 6) based on the model. In another example, the data rendering module may display the model associated with the area of interest. The operation may then be adjusted or performed based on the display. For example, a user may create a new well trajectory for an operation based on an acoustic impedance model such that the new well trajectory intersects a location with high acoustic impedance. In this example, high acoustic impedance may indicate that a location has a higher porosity, which may indicate that the location has a larger amount of oil. In another example, a user may use an acoustic impedance model to generate a well trajectory to be used in an exploration operation.

The method in FIG. 7 is depicted in a specific order. However, it will be appreciated that portions of the method may be performed simultaneously or in a different order or sequence.

FIG. 8 shows a flow chart of a method for generating a neural network. The method may be performed using, for example, the system of FIG. 6. Further, the method may describe the generating described as block 708 in FIG. 7 above.

The method involves obtaining a plurality of seismic well logs using the initial seismic cube and the plurality of shifted seismic cubes (block 802), obtaining the well log data associated with the area of interest (block 804), generating a neural network comprising the plurality of seismic well logs and the well log data (block 806), and training the neural network using the well log data to generate a weight matrix including a plurality of weights, where the plurality of weights are associated with the plurality of seismic well logs (block 808).

The plurality of seismic well logs may be obtained (block 802) from a variety of sources. More specifically, the plurality of seismic well logs may be obtained using the initial seismic cube and the plurality of shifted seismic cubes. For example, as discussed with respect to FIG. 6, a seismic well log may be obtained from seismic cubes using a modeling tool (648 of FIG. 6).

The well log data associated with the area of interest may be obtained (block 804) from a variety of sources. As discussed with respect to FIGS. 1A-1D and 6, subsurface entity information may be generated by sensors (S) at the wellsite or from other sources. The well log data may be transferred directly to the modeling tool (608 in FIG. 6), or transferred to the modeling tool via at least one of the servers (606 in FIG. 6). Well log data is then generally received by the interface of the modeling tool. The well log data may be associated with a group of wells. For example, the well log data may comprise acoustic impedance logs, where each acoustic impedance log is associated with a different well. In this example, the well log data may also be presented as output.

Next, the neural network may be generated using the plurality of seismic well logs and the well log data (block 806). More specifically, a neural network may be generated, where the plurality of seismic well logs is used as an input layer in the neural network and the well log data is used as an output layer in the neural network. For example, each of the plurality of seismic well logs may correspond to a neuron in the neural network.

The neural network may be trained using the well log data (block 808) by a variety of methods. More specifically, the neural network may be trained by using the well log data to generate a weight matrix including numerous weights, where the neural network further includes the weight matrix. In this case, the well log data may act as a stopping criterion for training the neural network. For example, a back propagation algorithm may be applied to the neural network, where weights are assigned to neurons in the neural network until the stopping criterion is satisfied. When the stopping criterion corresponds to the well log data, the assigned weights may combine neurons associated with the plurality of seismic well log samples to closely match acoustic impedance logs included in the well log data. A back propagation algorithm typically assigns weights by calculating errors associated with neurons in the neural network. In this case, the weights of the neurons may be adjusted to minimize the local error of each neuron in a neural network.

Alternatively, the neural network may be trained using some other learning algorithm. Examples of other learning algorithm include evolutionary computation algorithms, a statistical estimation algorithm, or swarm intelligence algorithms. Typically, a neural network is used to model relationships between observed inputs and outputs. In other words, a trained neural network may be used to infer a function based on sets of observed data. In this case, each learning algorithm may result in a variety of trained neural networks, where each trained neural network describes a different function for the same set of observed inputs and outputs.

The method in FIG. 8 is depicted in a specific order. However, it will be appreciated that portions of the method may be performed simultaneously or in a different order or sequence.

Figure 9:
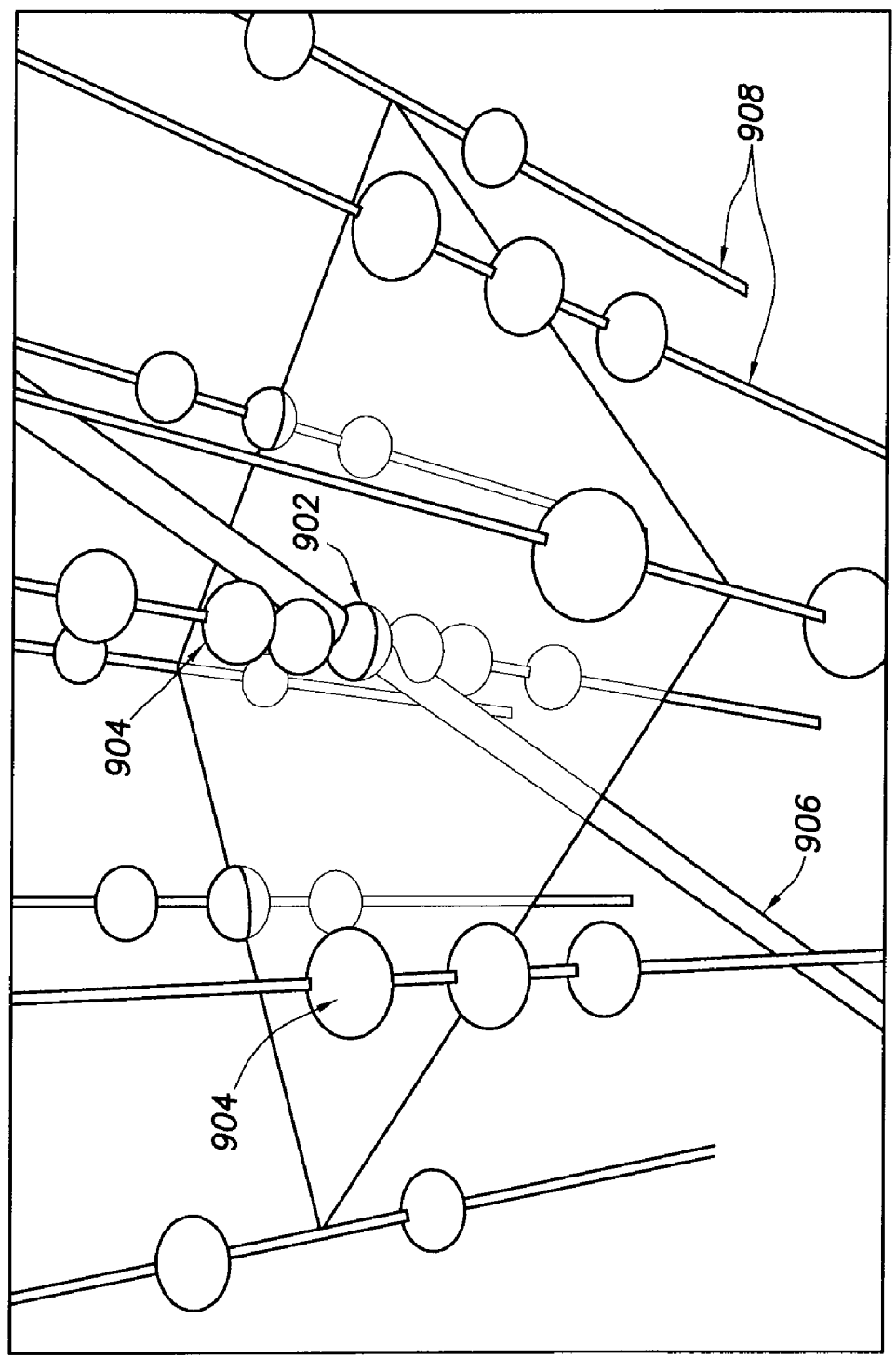
FIG. 9 shows an exemplary representation of a group of shifted seismic cubes.

FIG. 9 shows an exemplary graphical representation of a plurality of shifted seismic cubes as described in block 706 of FIG. 7 above. Here, the graphical representation includes an initial seismic cube (902), shifted seismic cubes (904), and a well trajectory (906). For example, the shifted seismic cubes (904) may be obtained by shifting the initial seismic cube (902). In this example, the frequency of shifted seismic cubes (904) decreases as the distance from the initial seismic cube (902) increases. Further, the well trajectory (906) may be associated with well log data. The graphical representation further includes seismic well log samples (908). For example, the seismic well logs may be based on the seismic data of seismic cubes (904) occurring along the seismic well logs.

Figure 10:
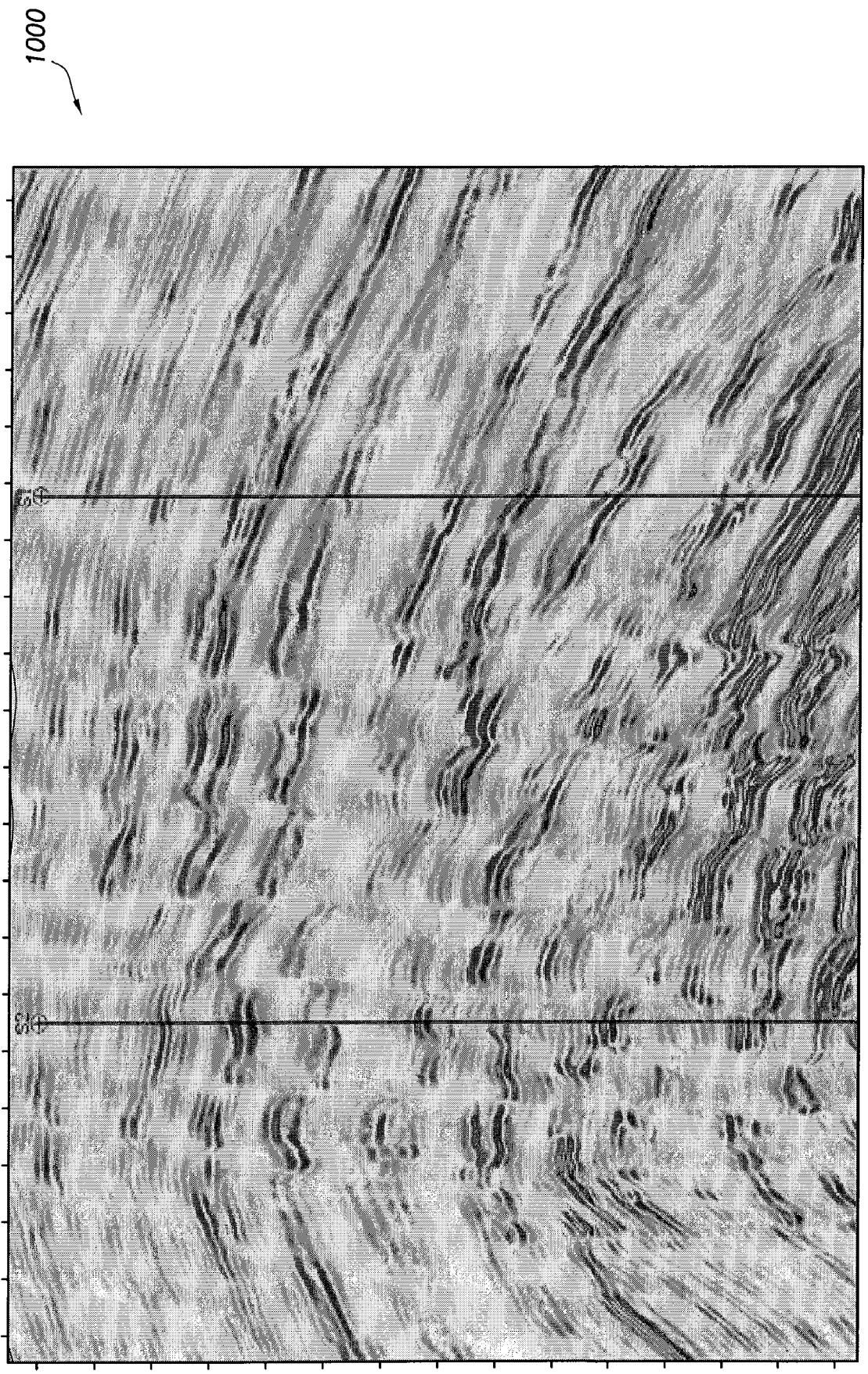
FIG. 10 shows an exemplary representation of a seismic data.

FIG. 10 shows an exemplary graphical representation of seismic data (1000) as obtained at block 702 in FIG. 7. The graphical representation (1000) includes seismic data related to an area of interest. The graphical representation (1000) may be presented to the user in a display as described in block 702 of FIG. 7 above. The seismic data may be obtained for the area of interest from a variety of seismic sources. Examples of seismic sources include, but are not limited to: a seismic truck, such as that described in FIG. 1A, seismic explosive, or a seismic survey boat.

Figure 11:
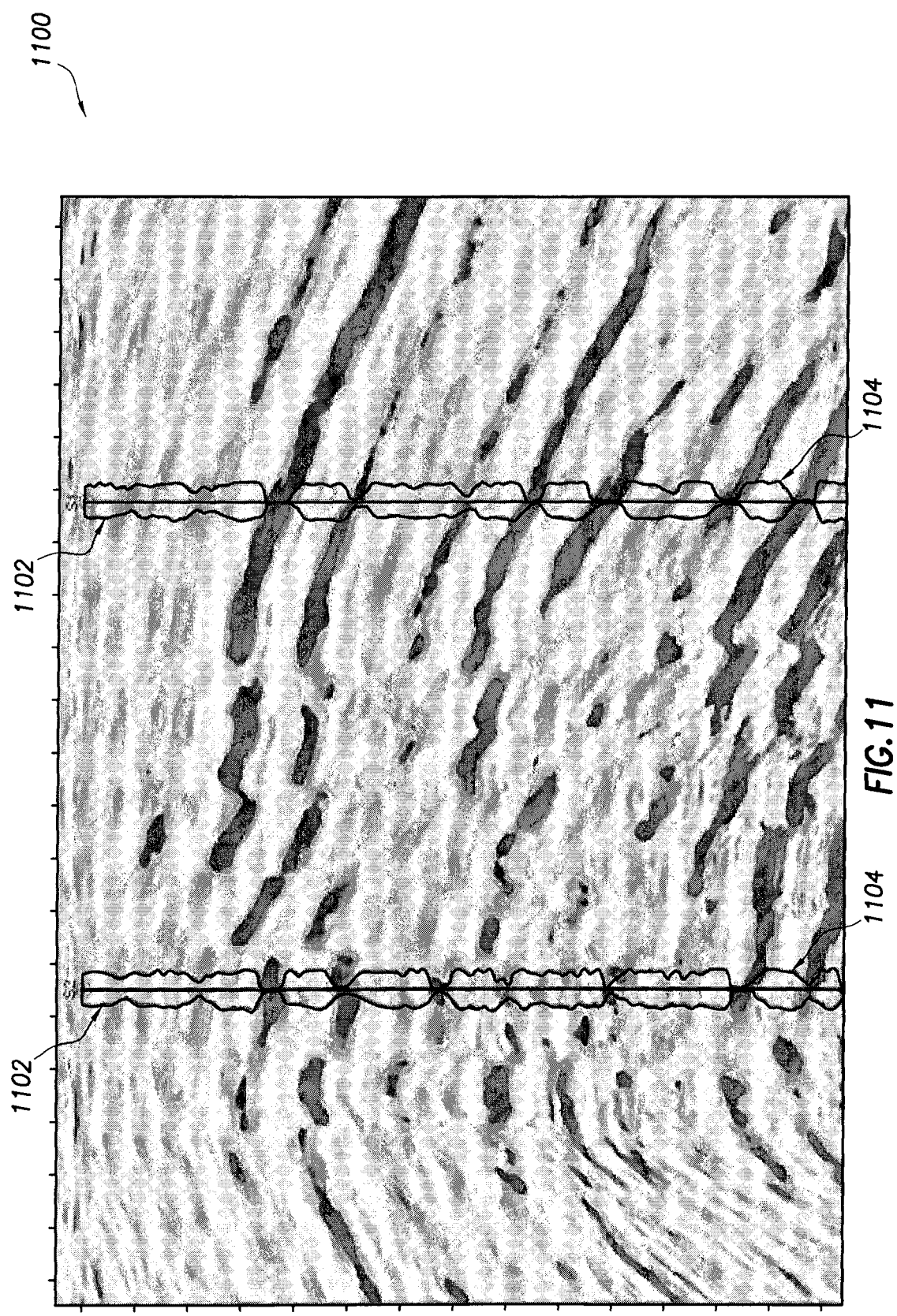
FIG. 11 shows an exemplary representation of a model.

FIG. 11 shows an exemplary graphical representation of a model (1100) as obtained at block 710 in FIG. 7. The graphical representation of the model (1100) includes observed logs (1102) associated with well log data and calculated logs (1104) based on the model. In this example, the calculated logs (1104) may be compared to the observed logs (1102) to determine the quality of the model (1100). More specifically, the quality of the model may be determined based on the correlation coefficient of the calculated logs (1104) and the observed logs (1102). For example, the observed logs (1102) may be based on acoustic impedance log data obtained at a well, and the calculated logs (1104) may be based on acoustic impedance data obtained from an acoustic impedance model. In this case, the correlation coefficient of the logs may correspond to the quality of the acoustic impedance model.

It will be understood from the foregoing description that various modifications and changes may be made to the embodiments described above without departing from the true spirit of subterranean formation properties prediction. For example, the method may be performed in a different sequence, and the components provided may be integrated or separate.

This description is intended for purposes of illustration only and should not be construed in a limiting sense. The scope of subterranean formation properties prediction should be determined only by the language of the claims that follow. The term "comprising" within the claims is intended to mean "including at least" such that the recited listing of elements in a claim are an open group. "A," "an" and other singular terms are intended to include the plural forms thereof unless specifically excluded.

While subterranean formation properties prediction has been described with respect to a limited number of embodiments, those skilled in the art, having benefit of this disclosure, will appreciate that other embodiments can be devised which do not depart from the scope of subterranean formation properties prediction as disclosed herein. Accordingly, the scope of subterranean formation properties prediction should be limited only by the attached claims.

What is claimed is:

1. A method for predicting subterranean formation properties of a wellsite, comprising:
   obtaining seismic data for an area of interest;
   obtaining, using a computer processor, an initial seismic cube using the seismic data, wherein the initial seismic cube is a three-dimensional representation of the seismic data;
   generating, using the computer processor, a plurality of shifted seismic cubes within the area of interest using the seismic data and a shifting parameter,
      wherein each of the plurality of shifted seismic cubes is shifted from the initial seismic cube, and
      wherein the shifting parameter defines a direction and a range that the initial seismic cube should be shifted;
   generating, using the computer processor, a neural network using the initial seismic cube, the plurality of shifted seismic cubes, and well log data; and
   applying the neural network to the seismic data to obtain a model for the area of interest, the model being configured for use in adjusting an operation of the wellsite.

2. The method of claim 1, wherein generating the neural network comprises:
   obtaining a plurality of seismic well logs using the initial seismic cube and the plurality of shifted seismic cubes;
   obtaining the well log data associated with the area of interest;
   generating the neural network, wherein the neural network comprises the plurality of seismic well logs and the well log data; and
   training the neural network using the well log data to generate a weight matrix, wherein the weight matrix comprises a plurality of weights associated with the plurality of seismic well logs.

3. The method of claim 2, wherein the weight matrix is generated using a back propagation algorithm and the well log data is used as a stopping criterion in the back propagation algorithm.

4. The method of claim 2, wherein generating the neural network further comprises decreasing a size of at least one of the plurality of weights based on a relative importance of each of the at least one of the plurality of weights.

5. The method of claim 1, wherein the model corresponds to an acoustic impedance model.

6. The method of claim 1, wherein the operation is one selected from a group consisting of an exploration operation, a drilling operation, and a production operation.

7. The method of claim 1, wherein the neural network describes a non-linear relationship between the seismic data and a geologic property of the area of interest.

8. The method of claim 1, wherein the direction is at least one selected from a group consisting of a vertical direction and a horizontal direction.

9. A system for predicting subterranean formation properties of a wellsite, comprising:
   a processing module configured to obtain seismic data for an area of interest;
   a modeling unit configured to:
      obtain an initial seismic cube using the seismic data, wherein the initial seismic cube is a three-dimensional representation of the seismic data; and shift the initial seismic cube to generate a plurality of shifted seismic cubes within the area of interest based on the seismic data and a shifting parameter, wherein each of the plurality of shifted seismic cubes is shifted from the initial seismic cubes, and wherein the shifting parameter defines a direction and a range that the initial seismic cube should be shifted;

a training module configured to:

generate a neural network using the initial seismic cube, the plurality of shifted seismic cubes, and well log data; and apply the neural network to the seismic data to obtain a model for the area of interest, the model being configured for use in adjusting an operation of the wellsite.

10. The system of claim 9, wherein:

the modeling unit is further configured to obtain a plurality of seismic well logs using the initial seismic cube and the plurality of shifted seismic cubes;

the processing module is further configured to obtain the well log data associated with the area of interest; and the training module is further configured to:

generate the neural network, wherein the neural network comprises the plurality of seismic well logs and the well log data; and train the neural network using the well log data to generate a weight matrix, wherein the weight matrix comprises a plurality of weights associated with the plurality of seismic well logs.

11. The system of claim 10, wherein the weight matrix is generated using a back propagation algorithm and the well log data is used as a stopping criterion in the back propagation algorithm.

12. The system of claim 10, wherein the training module is further configured to decrease a size of at least one of the plurality of weights based on a relative importance of each of the at least one of the plurality of weights.

13. The system of claim 9, wherein the model corresponds to an acoustic impedance model.

14. The system of claim 9, wherein the operation is one selected from a group consisting of an exploration operation, a drilling operation, and a production operation.

15. The system of claim 9, wherein the direction is at least one selected from a group consisting of a vertical direction and a horizontal direction.

16. A computer program product, embodying instructions executable by a computer to predict subterranean formation properties of a wellsite, the instructions comprising functionality to:

obtain an initial seismic cube using the seismic data, wherein the initial seismic cube is a three-dimensional representation of seismic data;

generate a plurality of shifted seismic cubes within an area of interest using the seismic data and a shifting parameter, wherein each of the plurality of shifted seismic cubes is shifted from the initial seismic cube, and wherein the shifting parameter defines a direction and a range that the initial seismic cube should be shifted;

train a neural network comprising the initial seismic cube and the plurality of shifted seismic cubes based on well log data; and apply the neural network to the seismic data to obtain a model for the area of interest, the model being configured for use in adjusting an operation of the wellsite.

17. The computer program product of claim 16, the instructions further comprising functionality to:

obtain a plurality of seismic well logs using the initial seismic cube and the plurality of shifted seismic cubes;

obtain the well log data associated with the area of interest;

train the neural network using the well log data to generate a weight matrix, wherein the weight matrix comprises a plurality of weights associated with the plurality of seismic well logs.

18. The computer program product of claim 17, wherein the weight matrix is generated using a back propagation algorithm and the well log data is used as a stopping criterion in the back propagation algorithm.

19. The computer program product of claim 17, wherein generating the neural network further comprises decreasing a size of at least one of the plurality of weights based on a relative importance of each of the at least one of the plurality of weights.

20. The computer program product of claim 16, wherein the direction is at least one selected from a group consisting of a vertical direction and a horizontal direction.

* * * * *